US009280752B2

(12) United States Patent
Pandrangi et al.

(10) Patent No.: US 9,280,752 B2
(45) Date of Patent: Mar. 8, 2016

(54) METHOD, SYSTEM AND COMPUTER-READABLE MEDIUM FOR E-FORM INFORMATION EXTRACTION TEMPLATE CREATION

(75) Inventors: Phani Pandrangi, San Jose, CA (US);
Loren Froomin, Loomis, CA (US);
Mike Noehren, San Ramon, CA (US);
Olaf Brinkmann, Muehltal (DE)

(73) Assignee: SOFTWARE AG, Darmstadt (DE)

( * ) Notice: Subject to any disclaimer, the term of this patent is extended or adjusted under 35 U.S.C. 154(b) by 720 days.

(21) Appl. No.: 12/954,773

(22) Filed: Nov. 26, 2010

(65) Prior Publication Data

US 2012/0137205 A1 May 31, 2012

(51) Int. Cl.
*G06F 17/20* (2006.01)
*G06Q 10/06* (2012.01)
*G06F 17/24* (2006.01)

(52) U.S. Cl.
CPC .............. *G06Q 10/06* (2013.01); *G06F 17/243* (2013.01); *G06Q 10/067* (2013.01)

(58) Field of Classification Search
CPC .................................................... G06F 17/243
USPC ......................................................... 715/223
See application file for complete search history.

(56) References Cited

U.S. PATENT DOCUMENTS

| | | | | |
|---|---|---|---|---|
| 6,675,353 | B1 * | 1/2004 | Friedman ...................... | 715/239 |
| 7,305,612 | B2 * | 12/2007 | Chakraborty .................. | 715/221 |
| 7,561,734 | B1 * | 7/2009 | Wnek .......................... | 382/159 |
| 7,623,710 | B2 * | 11/2009 | Simard et al. ................. | 382/175 |
| 7,725,817 | B2 * | 5/2010 | Krasun et al. ................. | 715/236 |
| 7,810,025 | B2 * | 10/2010 | Blair et al. ..................... | 715/239 |
| 7,870,478 | B1 * | 1/2011 | Chiaro et al. ................. | 715/223 |
| 2003/0078949 | A1 * | 4/2003 | Scholz et al. ................. | 707/505 |
| 2005/0235202 | A1 * | 10/2005 | Chen et al. .................... | 715/523 |
| 2005/0256834 | A1 * | 11/2005 | Millington et al. ............... | 707/1 |
| 2008/0098291 | A1 * | 4/2008 | Bradley et al. ............... | 715/223 |
| 2010/0057515 | A1 * | 3/2010 | Gandini et al. .................. | 705/8 |
| 2010/0057669 | A1 * | 3/2010 | Gandini et al. .................... | 707/1 |
| 2010/0250236 | A1 * | 9/2010 | Jagannathan et al. ............ | 704/9 |
| 2010/0251092 | A1 * | 9/2010 | Sun ............................. | 715/222 |
| 2011/0184870 | A1 * | 7/2011 | Angel et al. ................. | 705/301 |
| 2011/0251967 | A1 * | 10/2011 | Klivington et al. ........... | 705/313 |
| 2012/0016805 | A1 * | 1/2012 | Graupner et al. ............. | 705/342 |

OTHER PUBLICATIONS

Graupner, Sven et al—"Making Processes From Best Practice Frameworks Actionable"—HP Laboratories HPL—2009-196—Published in the 3rd Business-driven IT Management (BDIM 2009), Hofstra University, Long Island, NY, Jun. 1-5, 2009—pp. 1-11.*

(Continued)

*Primary Examiner* — Mohammed-Ibrahim Zuberi
(74) *Attorney, Agent, or Firm* — Nixon & Vanderhye P.C.

(57) ABSTRACT

Certain example embodiments described herein relate to techniques for enabling a business process model (BPM) to be transparent (in whole or in part) from the source of data that triggers it. More particularly, certain example embodiments relate to techniques enabling transparent composition and decomposition of e-form data from one or more e-form formats into data that is directly usable by a Business Process Model Engine. Information from an e-form may, for example, be used in a business process, e.g., after a template or document type is created that represents the e-form in a format that the BPM Engine understands, and the e-form may be transparently composed into and decomposed out from the business data in certain example embodiments.

20 Claims, 13 Drawing Sheets

(56) References Cited

OTHER PUBLICATIONS

Software AG "Implementing E-form Support for BPM", Version 8.0, pp. 1-52 (Jan. 2010).
EBIZ "Sofware AG Announces webMethods 8.0, With Integrated Business Service Repository; Links SOA with Process Improvement", pp. 1-2 (Jun. 24, 2009).
Microsoft InfoPath. Wikipedia. [retrieved Jul. 29, 2011] http://en.wikipedia.org/wiki/Microsoft_InfoPath.
Microsoft InfoPath 2010. MicrosoftOffice.com [retrieved Jul. 29, 2011] http://office.microsoft.com/en-us/infopath.
InfoPath 2010 Features and Benefits. MicrosoftOffice.com. [retrieved Jul. 29, 2011] http://office.microsoft.com/en-us/infopath/infopath-2010-features-and-benefits-HA101806949.aspx.
Adobe LiveCycle ES2.5. Adobe-LiveCycle Enterprise Suite. [retrieved Jul. 29, 2011] http://www.adobe.com/products/livecycle.
Adobe LiveCycle ES2.5 Overview, Version 9.5, Oct. 15, 2010. [online] [retrieved Jul. 29, 2011] http://help.adobe.com/en_US/livecycle/9.0/overview.pdf.

* cited by examiner

Fig. 1

METHOD, SYSTEM AND COMPUTER-READABLE MEDIUM FOR E-FORM INFORMATION EXTRACTION TEMPLATE CREATION

FIELD OF THE INVENTION

Certain example embodiments described herein relate to techniques for transparent business data composition. More particularly, certain example embodiments described herein relate to techniques for enabling a business process model (BPM) to be transparent (in whole or in part) from the source of data that triggers it.

BACKGROUND AND SUMMARY OF EXAMPLE EMBODIMENTS OF THE INVENTION

A Business Process Model Engine (BPM Engine) typically is responsible for the execution of a well-defined business process, e.g., in a complex, distributed computing environment where a business process model (BPM) may be used.

The data that may be provided to the BPM Engine typically is limited to very specific formats. Despite this typical limitation, the number of available formats of data is quite large and the available formats are quite broad in scope and content. For example, information may be provided from structured data files, user-entered fields in a defined user interface (UI), triggers in a database, forms, etc. Each such technique for data input typically supports the complex translation of the input data into a structure that is meaningful to the BPM Engine.

In this context, the "complex translation of the input data" means that the author of the business process model and its input trigger must have knowledge of (1) the BPM Engine trigger format, and also (2) the format of the source data to be able to translate the input source data into a form that is understood by the BPM Engine.

Oftentimes, the BPM Engine uses data in a form that is referred to as a template or document type, and the structure of that document generally is well defined, and highly controlled to help ensure that the BPM Engine receives information in a format that it understands.

Conventionally, electronic forms or e-forms have been used by corporations, courts, states, hospitals, etc., to capture data. The structure of such e-forms, including the layout of fields, the data type of each field, the relationships between fields, etc., is generally flexible. As an example result, it will be appreciated that an e-form used to capture an address change would not look like an e-form used to capture a purchase order. That is, there typically will be differences both in terms of the layout of the e-form and the information gathered via the e-form.

Broad interactions exist with e-forms. For instance, when an organization captures data in an e-form it may, for example:
Store the e-form documents directly within internal systems, e.g., to satisfy regulatory requirements;
Manually extract, e.g., via scanning and optical character recognition (OCR), re-typing, etc., the data in the e-form into internal systems for further processing; and/or
Use e-form specific controls and/or e-form specific APIs to extract the data from the e-form and place the data into a structured format and/or file that may be parsed manually or programmatically.

With respect to storing the e-form documents directly within internal systems, a business process model may be used to move and/or store e-form documents into internal systems, and may not have the ability to interact with the contents or data of those documents. For example, the process may carry the e-form as an image attachment, but be unable to work with or use the data therein.

Although manually extracting the data in the e-form into internal systems for further processing may achieve an interaction with the e-form data, it nonetheless requires manual extraction of the data before a business process model may use it.

Using e-form specific controls and/or APIs to extract the data from the e-form and place the data into a structured format and/or file that may be parsed manually or programmatically may provide programmatic interaction with the e-form data. However, it may still require form-specific API knowledge to extract the e-form data for use in a business process model.

Given these shortcomings with certain conventional techniques used to capture data in an e-form, as well as the needs of the BPM Engine itself, it will be appreciated that the author of the business process model generally must understand the format and details of the e-form itself (e.g., its internal data model); the format and details of the BPM Engine internal data model; how to translate via APIs (or via manual steps) the format of, and data contained in, the e-form into a format that the BPM Engine understands; and/or the like.

Thus, it will be appreciated that there is a need in the art for techniques that enable transparent composition and decomposition of e-form data from one or more e-form formats into data that is directly usable by a Business Process Model Engine. For instance, it would be desirable to be able to compose and decompose e-form data from Adobe® LiveCycle®, Microsoft® InfoPath®, etc., e-forms, into data that is directly usable by a BPM Engine.

One aspect of certain example embodiments relates to a tool that helps support the creation of a document that triggers a business process model. Another aspect of certain example embodiments includes support for the creation of such trigger documents based on an e-form (e.g., an Adobe® LiveCycle®, Microsoft® InfoPath®, or other e-form) without the need for manual steps, and/or deep knowledge of, or use of, any vendor-specific APIs from the parent products.

One aspect of certain example embodiments relates to example transparent composition/decomposition techniques, e.g., for electronic forms used in connection with a Business Process Model (BPM) process. In certain example embodiments, such example transparent composition/decomposition techniques create a dynamic environment where, for instance, on-the-fly and/or dynamic editing of an e-form is possible with a reduce (or no) impact on a corresponding BPM process.

Another aspect of certain example embodiments relates to reducing and sometimes even eliminating the need for manual retyping and/or scanning of e-forms.

Another aspect of certain example embodiments relates to reducing and sometimes even eliminating the need for deep knowledge of the internal structure of the e-form itself.

Another aspect of certain example embodiments relates to reducing and sometimes even eliminating the need for deep knowledge of the data format required by the BPM Engine.

Another aspect of certain example embodiments relates to reducing and sometimes even eliminating the need for e-form vendor specific knowledge and/or APIs.

Still another aspect of certain example embodiments relates to making the contents of the e-form transparently available to trigger a BPM.

Still another aspect of certain example embodiments relates to making the contents of the e-form transparently available for programmatic interpretation by the BPM Engine.

Yet another aspect of certain example embodiments relates to transparently decomposing the contents of the e-form into a BPM-Engine understandable format.

Yet another aspect of certain example embodiments relates to transparently composing the contents of the BPM-Engine understandable format back into the e-form.

In certain example embodiments, a method of transparently decomposing, composing, and/or recomposing documents is provided. An electronic form (e-form) is received, with the e-form being created according to a first source type. An algorithm (which may be located in and/or executed from a data store, for example) with predefined rules for extracting information regarding the structure and/or layout of the e-form is consulted, via at least one processor, with at least some of the information to be extracted corresponding to structure and/or layout information that would be apparent if the e-form were viewed and at least some of the information to be extracted corresponding to structure and/or layout information that would not be apparent if the e-form were viewed. The information regarding the structure and/or layout of the e-form is extracted, via the at least one processor, based on the predefined rules. A template or document type is built, via the at least one processor, based on the extracted information, the template or document type being in a second source type different from the first source type. The template or document type is stored to a non-transitory storage location.

In certain example embodiments, a system for transparently decomposing, composing, and/or recomposing documents is provided. An interface is configured to receive an electronic form (e-form), with the e-form being created according to a first source type. An algorithm (which may be located in and/or executed from a data store, for example) includes predefined rules indicating how information regarding the structure and/or layout of the e-form is to be extracted, with at least some of the information to be extracted corresponding to structure and/or layout information that would be apparent if the e-form were viewed and at least some of the information to be extracted corresponding to structure and/or layout information that would not be apparent if the e-form were viewed. At least one processor is configured to: extract the information regarding the structure and/or layout of the e-form based on the predefined rules; build a template or document type based on the extracted information, with the template or document type being in a second source type different from the first source type; and store to a non-transitory storage location the template or document type.

In certain example embodiments, a method of transparently decomposing, composing, and/or recomposing documents is provided. A request for an e-form is received from a user, with the e-form being in a first format or of a first type. The e-form is built based on previously defined structure and format information about the e-form, and content data provided regarding the e-form. The user is able to edit the e-form, with the e-form being editable while in a second format or of a second type. The e-form is saved in the first format or first type based on the previously defined structure and format information about the e-form, and the user's edits.

In certain example embodiments, a system for transparently decomposing, composing, and/or recomposing documents is provided. An interface is configured to receive a request for an e-form from a user, with the e-form being in a first format or of a first type. At least one processor is configured to: build the e-form based on previously defined structure and format information about the e-form, and content data provided regarding the e-form; enable the user to edit the e-form, with the e-form being editable while in a second format or of a second type, and save the e-form in the first format or first type based on the previously defined structure and format information about the e-form, and the user's edits.

In certain example embodiments, a method of transparently decomposing, composing, and/or recomposing documents is provided. A request for an e-form is received from a user, with the e-form being in a first format or of a first type. The e-form is built based on previously defined structure and format information about the e-form, and content data provided regarding the e-form. The e-form is saved in a third format or third type based on further, different previously defined structure and format information about the e-form, and the user's edits. The first and third formats or first and third types are not directly understandable by a business process model (BPM) engine. The second format or second type is directly understandable by the BPM engine.

In certain example embodiments, there are provided non-transitory computer readable storage mediums tangibly storing instructions that, when executed by at least one processor of a system, perform the above-described and/or other methods.

These aspects and example embodiments may be used separately and/or applied in various combinations to achieve yet further embodiments of this invention.

BRIEF DESCRIPTION OF THE DRAWINGS

These and other features and advantages may be better and more completely understood by reference to the following detailed description of exemplary illustrative embodiments in conjunction with the drawings, of which:

FIG. 1 is an example purchase order e-form for a fictitious company;

DETAILED DESCRIPTION OF EXAMPLE EMBODIMENTS OF THE INVENTION

Certain example embodiments relate to techniques enabling transparent composition and decomposition of e-form data from one or more e-form formats into data that is directly usable by a Business Process Model (BPM) Engine. For instance, certain example embodiments provide techniques that make it possible to compose and decompose e-form data from Adobe® LiveCycle®, Microsoft® InfoPath®, etc., e-forms, into data that is directly usable by a BPM Engine.

Two example scenarios are provided below to help demonstrate the techniques of certain example embodiments. Although the example scenarios are presented in connection with purchase order and change of address, it will be appreciated that the techniques described herein may be applied to other business process models separate from, or together with, the example scenarios that follow below.

Example Purchase Order E-Form

Figure 1:
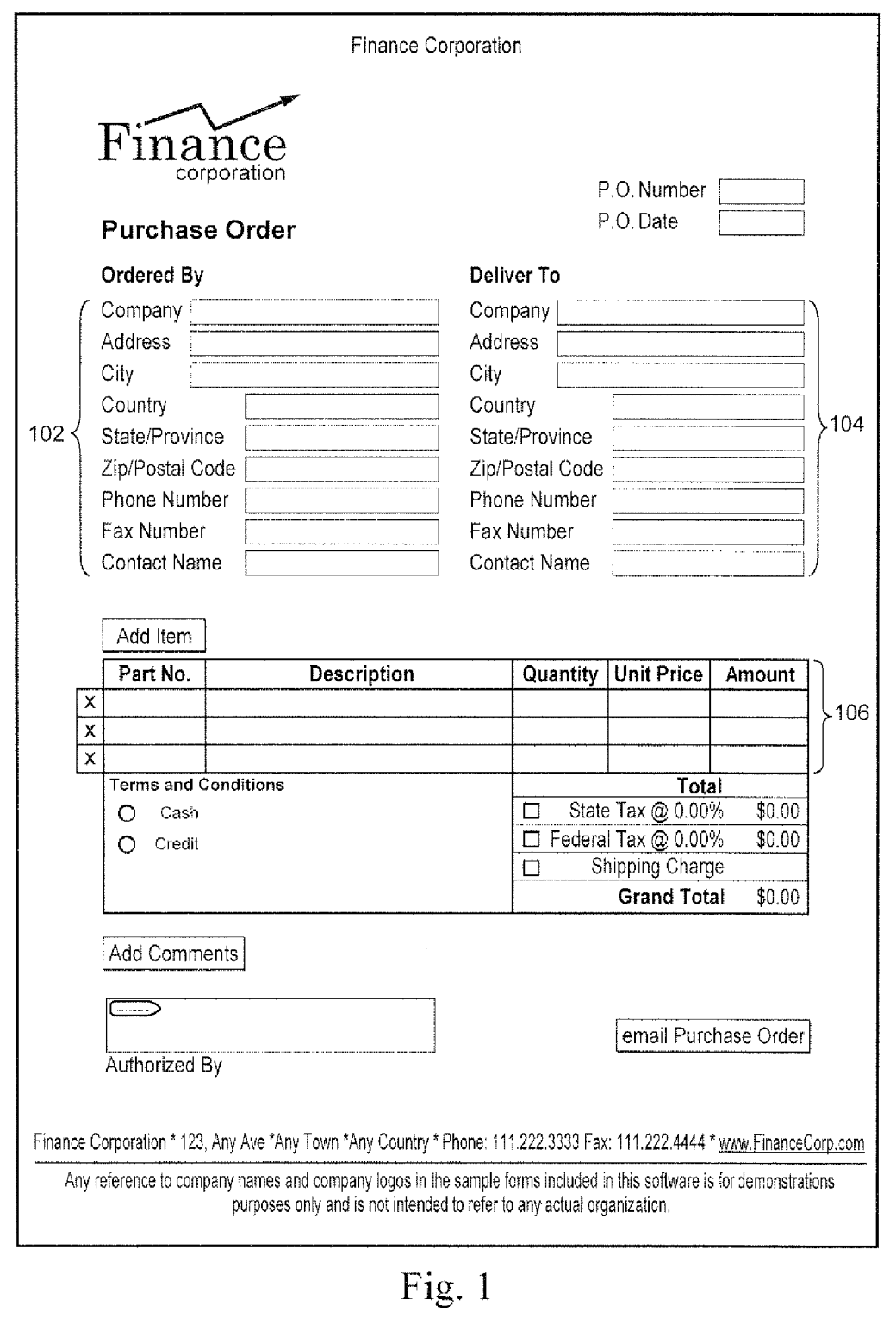

FIG. 1 is an example purchase order e-form for a fictitious company. The FIG. 1 example e-form includes an "Ordered By" area 102 that enables a user to specify company, address, and contact information for the purchaser, as well as a "Deliver To" area 104 that includes similar information. A user may enter information about the items to be ordered (including the part number and quantity, for example) in the item information area 106. The e-form may be automatically populated with description, unit price, total amount, and/or other data in response to the user's specifications. Payment information may be provided, along with optional further comments. The purchase order may be assigned a number and date as shown in the FIG. 1 example.

Conventionally, certain steps must be taken in order to use the information from such an example e-form in an example business. For instance, a template or document type that represents the e-form in a format that the BPM Engine understands may be created. In addition, a way to compose and decompose the e-form into and out from the business data also may be provided. Unfortunately, according to conventional techniques, these steps are manual and require deep knowledge about both the internal structure of the e-form and the data format that the BPM Engine needs, and/or deep knowledge of the vendor-specific APIs and tools available for interacting with the e-form.

Example techniques for creating a template or document type of the e-form in a BPM-Engine understandable format will now be described. In this example, an example BPM Engine understandable document called "handCrafted" is created using a design-time tool. To provide context, it is noted that the e-form in FIG. 1 has related, structured, and complex fields. For example, there is a header that groups together the P.O. Number, the P.O. Date, and the "Ordered By" and "Deliver To" addresses briefly described above. There also is a details section that groups together a list of details about each item being ordered, as well as a list of totals for each set of items. A comments area also is provided.

Figure 2:
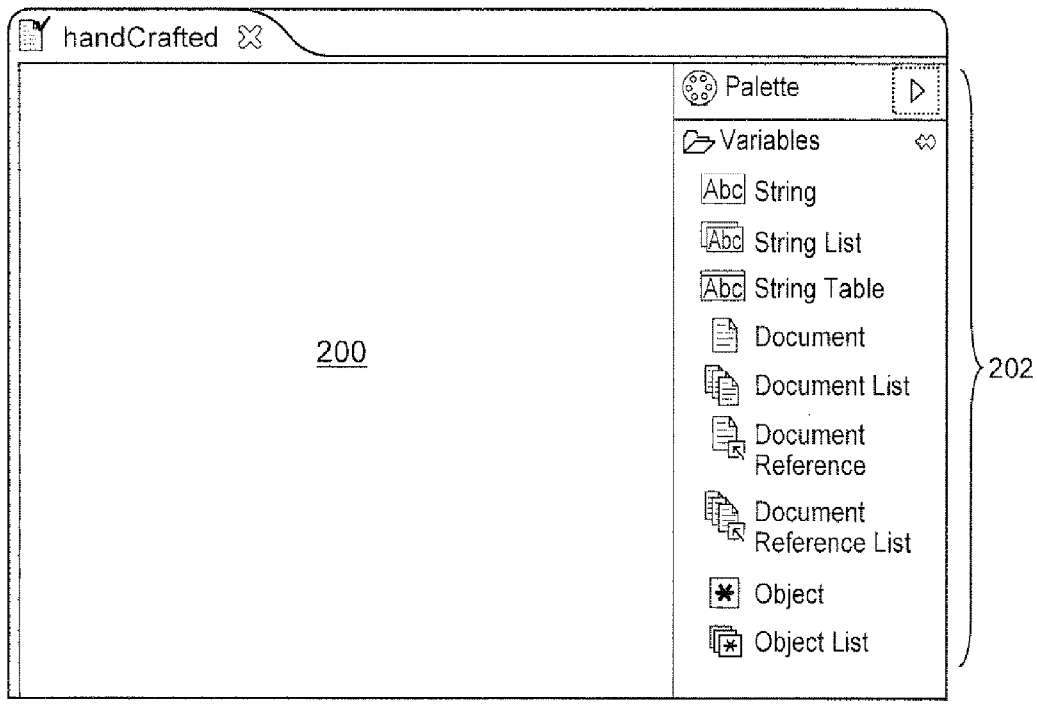
FIG. 2 shows an example empty document type.
Figure 3:
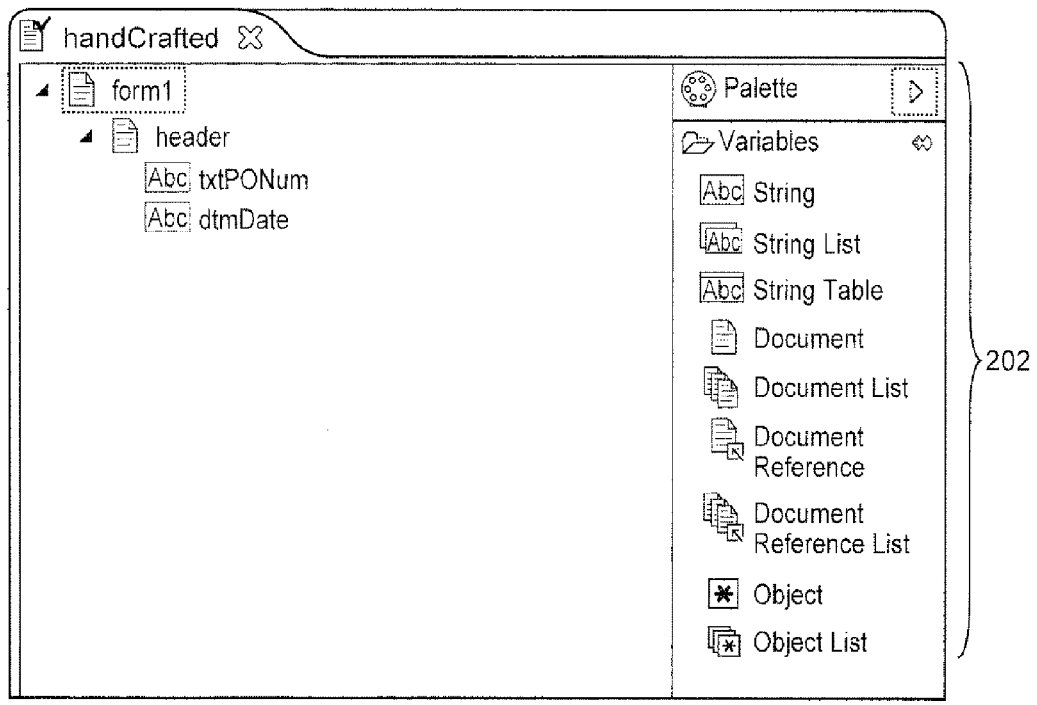
FIG. 3 shows a document type with several of the fields from the FIG. 1 example e-form added.

A "wizard" or other graphical user interface (GUI), or other input means, may be used to create the BPM Engine understandable handCrafted document. For instance, an empty document type may be created, e.g., with a user-specified name. This may be followed by an extended manual activity to add the needed fields in the proper structure. FIG. 2 shows an example empty document type, and FIG. 3 shows a document type with several of the fields from the FIG. 1 example e-form added. As shown in FIGS. 2-3, a user may define the contents of one or more forms in the area 200, e.g., using the tools in the palette area 202. As shown in FIG. 3, for example, strings txtPONum and dtmDate are provided within the header group of form 1 and correspond to the P.O. Number and P.O. Date shown in the upper right of the FIG. 1 example form. The FIG. 3 hierarchy represents the beginning of an "educated guess" as to how the e-form is actually structured. It follows, then, that a user at design time, for example, may continue to add fields and the like to structure the handCrafted document in a manner that represents the FIG. 1 example e-form.

It will be appreciated from the FIG. 3 example that the manual actions needed to create a meaningful document type are laborious and may lead to inadvertent errors. Another issue is that deep knowledge of the e-form's internal structure is needed to ensure that manually adding the corresponding fields closely or exactly matches the complete structure of the e-form. For instance, many e-form providers (such as, for example, Adobe® and Microsoft®) embed, link to, or otherwise reference additional information that a person designing the handCrafted document normally would not know about, would not appreciate or, at best, would not know how to correspondingly embed, link to, or otherwise reference in a manner expected by and/or compatible with the e-form format. The absence of such information may in certain example instances render the custom-designed document type wholly or partly unusable.

Indeed, as will be shown below, the structure of the transparently created document type of certain example embodiments contains many non-obvious fields that are required in order for the document type's structure to closely or exactly match the e-form's internal structure. This process is contrastable with the state of the art, which essentially requires the author of the business process to have a deep understanding of the internal structure of the e-form itself. Furthermore, although vendor-specific APIs may be provided in certain example instances to help alleviate such problems, this approach merely substitutes one problem for another in that the author of the business process must instead become familiar with the vendor-specific APIs to translate the e-form into a BPM Engine usable form.

Figure 4:
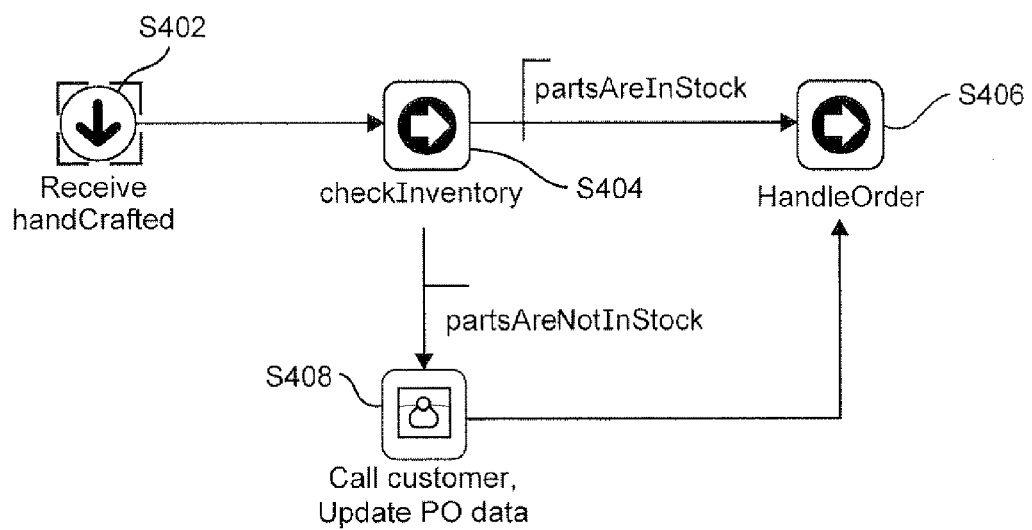
FIG. 4 is an example simple purchase order process triggered by a hand crafted document.

FIG. 4 is an example simple purchase order process triggered by a handCrafted document. In other words, the FIG. 4 example process may be triggered by the example purchase order e-form shown in FIG. 1, e.g., upon receipt of a document according to the handCrafted document type (step S402). The inventory may be checked to determine if the parts ordered are in stock (step S404). The process either handles the order if there are parts available (step S406) or sends the current values of the business data to a task step where a user works with that business data (step S408). The task step (step S408) is currently where manual work, deep knowledge about both the internal structure of the e-form and the data format required by the BPM Engine, and/or deep knowledge of the vendor-specific APIs and tools available for interacting with the e-form, is/are required. Consider the following illustrative situation, which involves Acme Company placing an order in connection with the FIG. 4 example process.

The Acme Company places an order for 10 widgets by filling in the purchase order e-form, e.g., as shown in FIG. 1. The populated e-form is somehow used to trigger a simple purchase order process, e.g., as shown in FIG. 4. It will be appreciated that this illustrative situation assumes that a triggering approach has been developed and implemented, but it also will be appreciated from the description provided herein that it may sometimes be difficult to develop and/or implement such a triggering approach.

As indicated above, the checkInventory step (step S404) determines whether parts are available for delivery to Acme Company and, if so, the order is "handled" by the handleOrder step (step S406). However, when the parts are not available, the task step "Call Customer, Update PO data" (step S408) is executed. When there are not enough parts to fulfill Acme Company's purchase order, the current state of the business process data is passed to the task step (step S408) for a user to interact with, for example. It will appreciated that even though for this simple example process the current state of the business process data would be unchanged, a more typical business process would be more complex and typically have a number of changed values in that data. Of course, it will be appreciated that example embodiments described herein are capable of handling situations where data is uncharged or changed.

A person (userX in this example) handling the task step now receives the business data in the BPM Engine format. At that point, if userX needs and/or wants to work with the data in the original e-form format (which would be useful and sometimes perhaps even necessary in certain example instances, e.g., when talking to the customer), then userX typically either manually enters the data into a blank e-form or uses a specialized Acme-created user interface that maps the business data into the e-form, or uses vendor-specific APIs to perform that translation. It will be appreciated that the term "userX" is treated very generally herein. In certain example instances, such a user likely would not have the knowledge to use vendor-specific APIs. In fact, an Acme person with deep knowledge of those APIs likely would have created a separate tool for userX to use. In any event, in order for userX to work with the business data in a format that is meaningful and convenient to both userX and Acme's customer typically involves manual work, deep knowledge about both the internal structure of the e-form and the data format required by the BPM Engine, and/or deep knowledge of the vendor-specific APIs and tools available for interacting with the e-form.

As will be appreciated, typical scenarios involve manual work, deep knowledge about both the internal structure of the e-form and the data format required by the BPM Engine, and/or deep knowledge of the vendor-specific APIs and tools available for interacting with the e-form. Furthermore, in some cases, absent some ability to access the data within the e-form (e.g., by attaching the e-form itself as an object to the triggering data), no insight is provided into the e-form's contents and, thus, a programmatic reaction is not available in response to the contents of the e-form. As such, plans to automate a business process may be restricted in some ways. Furthermore, if the e-form is scanned, then the document may be treated strictly as an image and, as a result similar to the above, the document contents may be obscured. If, however, the scanned document is interpreted by optical character recognition (OCR) or other software, then the potential for errors creeps in. Additionally, there is a need to manually scan the e-forms, which involves the use of human resources.

Certain example embodiments will now be explained with reference to the example purchase order shown in FIG. 1. That is, the FIG. 1 example purchase order will be used to help describe how the information from an e-form may be used in a business process, e.g., after a template or document type is created that represents the e-form in a format that the BPM Engine understands, and how the e-form can be transparently composed into and decomposed out from the business data.

In this example scenario, a BPM-Engine understandable document named transparentPO is created. An e-form source type may be specified (e.g., to specify an Adobe® Live-Cycle®, Microsoft® InfoPath®, or other, e-form), and/or a source e-form file may be specified (e.g., upon the user specifying a location for the same on a local or remote file system).

A design tool completes the creation of the document type for the user transparently, e.g., without using any e-form vendor specific APIs. As can be seen from the FIG. 5 example template or document format that represents the e-form in a BPM Engine readable format, the format of the document type contains a header section and a details section (inclusive of the detail and total lists), each with the necessary fields. In addition to the fields that are apparent from a "plain viewing" of the purchase order form in FIG. 1, non-obvious fields also are transparently included.

Figure 5:
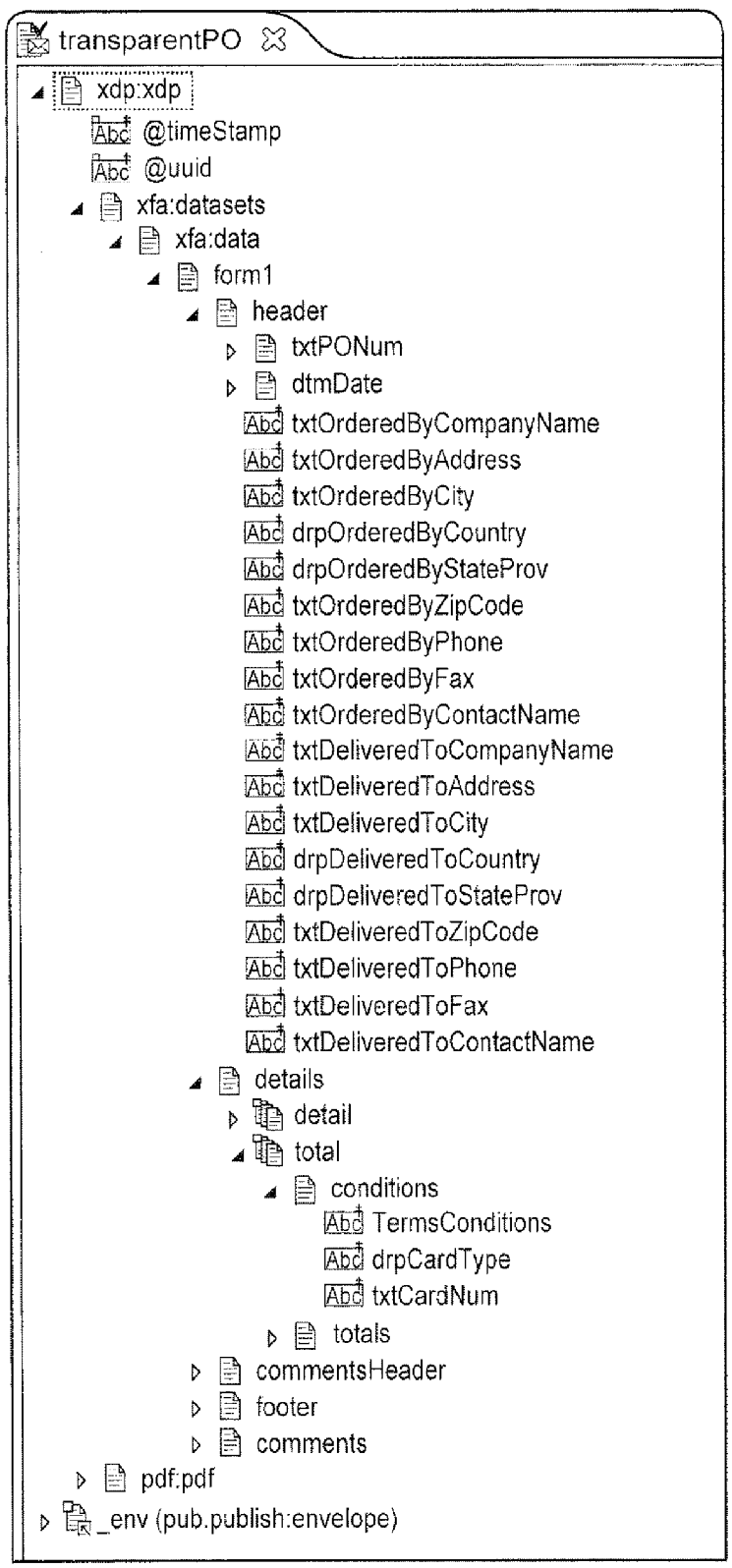
FIG. 5 is an illustrative template or document format that represents the e-form in a BPM Engine readable format produced in accordance with certain example embodiments.

More particularly, in the FIG. 5 example, information for the apparent fields is included. This information includes, for example, text areas for the ordering company name and address, the location to which the order is to be delivered, the purchase order number, etc. In addition, however, non-obvious fields also are included. As can be seen in the FIG. 5 example, the data is structured in a perhaps non-obvious way in that the fields are located within a header container, which is a part of a form which, in turn, belongs to a data group. The data group references the xfa namespace, and the data group itself belongs to a datasets collection that also references the xfa namespace. This hierarchical organization is not apparent from a plain viewing of the purchase order form in FIG. 1. Moreover, even though not readily visible, it will be appreciated that the namespace information potentially is required for the proper operation of the e-form. The inclusion of some or all of such information thus is desirable in the sense that the e-form may or may not work without it. For example, the exact structure of the apparent data fields need not necessarily match in a one-to-one manner for the e-form to work, but the namespace information may be necessary for the e-form's proper operation.

Although some existing products are capable of providing a translation similar to the FIG. 5 example template or document type, they disadvantageously make use of vendor-specific APIs. Similarly, vendor-specific APIs typically are needed at runtime. By contrast, certain example embodiments may compose business-process runtime data from a populated or filled in e-form document, e.g., without the use of vendor-specific APIs. The above example document type (e.g., as represented in FIG. 5), which is based upon an e-form document, may in certain example embodiments be a static document type that represents the e-form.

Figure 6:
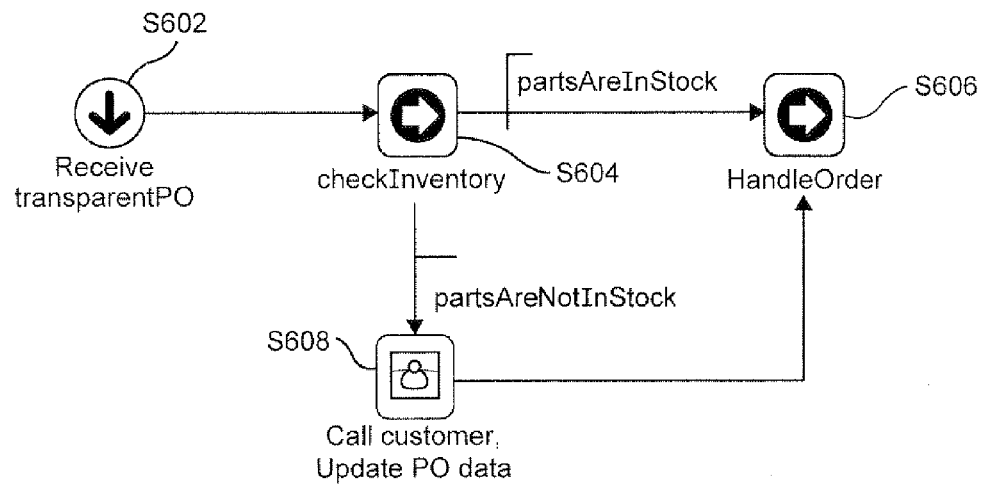
FIG. 6 is a simple example purchase order process triggered by a transparently composed document in accordance with certain example embodiments.

Example techniques for the composition and decomposition of the data in a filled-in e-form into and out from a business process will now be described in greater detail. FIG. 6 is a simple example purchase order process triggered by a transparently composed document in accordance with certain example embodiments. FIG. 6 thus is somewhat similar to FIG. 4. For instance, similar to the FIG. 4 example, the FIG. 6 example process is triggered by a purchase order e-form (step S602), e.g., similar to the example shown in FIG. 1. Inventory is checked to determine if the ordered parts are in stock (step S604). The FIG. 6 example process then either handles the order if there are parts available (step S606) or sends the current values of the business data to a task step where a user works with that business data (step S608). Unlike the FIG. 4 example process, however, current values of the business data are transparently re-composed into the e-form in the FIG. 6 example process. Additionally, decomposition of the updated e-form data back into business data may be performed in the task step (step S608). The following illustrative scenario demonstrates what happens when the Acme Company places an order that is processed in accordance with the FIG. 6 example process.

The Acme Company places an order for 10 widgets by filling in a purchase order e-form, e.g., as shown in FIG. 1. The populated e-form may be directly used to trigger the simple example purchase order process of FIG. 6 by placing it into a location to which the BPM Engine is listening. In certain example embodiments, each e-form may be configured to have a unique location. Advantageously, in certain example implementations, there is no further action required on the part of the person placing the order and, in addition, there advantageously are no additional steps that the author of the business process needs to undertake to help ensure such functionality. For instance, there is no need to understand and use specific or dedicated APIs for translating or mapping the e-form into business process data. Rather, in certain example embodiments, simply placing the filled-in e-form into the location that the BPM Engine is listening to may automatically trigger the simple example purchase order process of FIG. 6.

The BPM Engine takes the contents of the e-form, including its data as well as the structure of the data, directly from the e-form and transparently decomposes it into the format of the transparentPO document type, which is in a format that the BPM Engine is capable of understanding. The BPM Engine understandable document may be used to trigger the process. The checkInventory step (step S604) determines whether parts are available and, if so, the order is handled by the handleOrder step (step S606).

When the parts are not available, the task step "Call Customer, Update PO data" (step S608) is executed. When there are not enough parts to fulfill the purchase order, then the current state of the business process data is passed to the task step for a user to interact with. It will be appreciated that in the FIG. 6 example scenario, the current state of the business process data at that point would be unchanged, even though a more typical business process may be more complex and may have a number of changed values in that data. As alluded to above, certain example embodiments may accommodate changing and unchanged data, e.g., resulting from the task step.

The person who handles the task step, userX, is then able to use the current business process data to transparently compose the purchase order e-form. For instance, userX may download the business process data to the desktop as a file that is identical in form to the e-form in FIG. 1, for example, but whose contents match the current state of the business process data. Neither the author of the business process nor userX had to use vendor specific APIs, write any special software, or even be aware of any details to enable that composition, in this example scenario.

Additionally, userX may open the downloaded e-form, view the current data, edit the data, save a now-updated version of that e-form back to the desktop, and upload. Such processes may involve transparent decomposition of the form into the format of the business process data that the BPM Engine understands for further handling by the process. Again, neither the author of the business process nor userX had to use vendor-specific APIs, write any special software, or even be aware of any details to enable that decomposition.

Example Change Address E-Form

Figure 7:
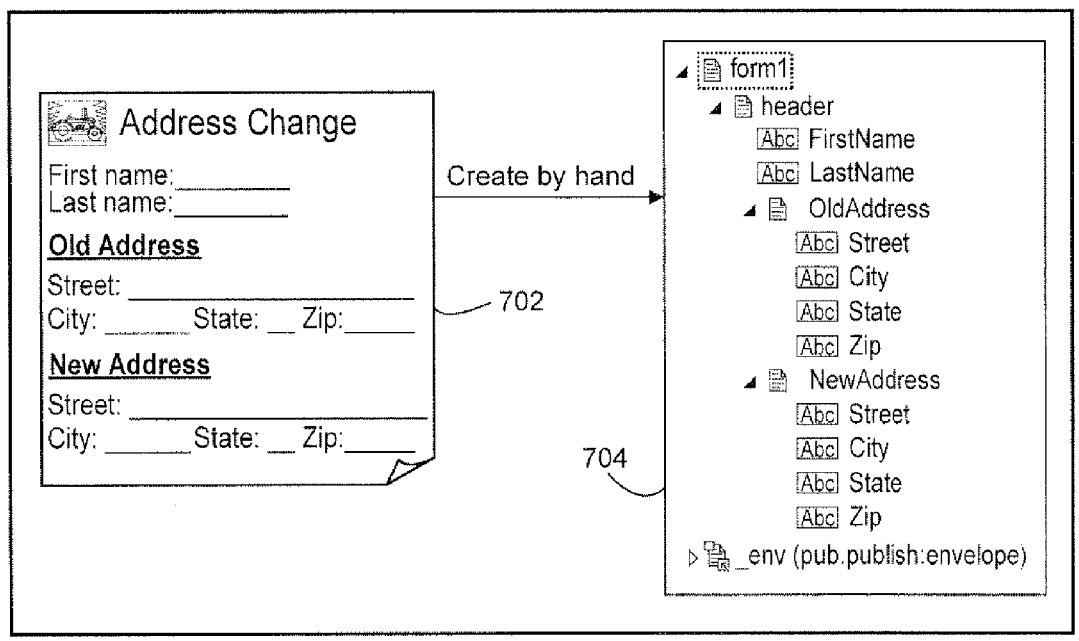
FIG. 7 illustrates an example design time process for generating a document type by hand.

This example scenario relates to an address change e-form. An example address change e-form may include, for example, the user's name, old address, and new address. FIG. 7 illustrates an example design time process for generating a document type by hand. A user examines the e-form 702 and creates the document type 704 by hand. Unfortunately, however, even with some deep internal e-form structure knowledge, creation of the document type by hand potentially produces a document type that does not match the original e-form, e.g., in the sense that non-obvious field name values and structure will not be included. As can be seen from FIG. 7, for example, namespace information and the like are absent.

Figure 8:
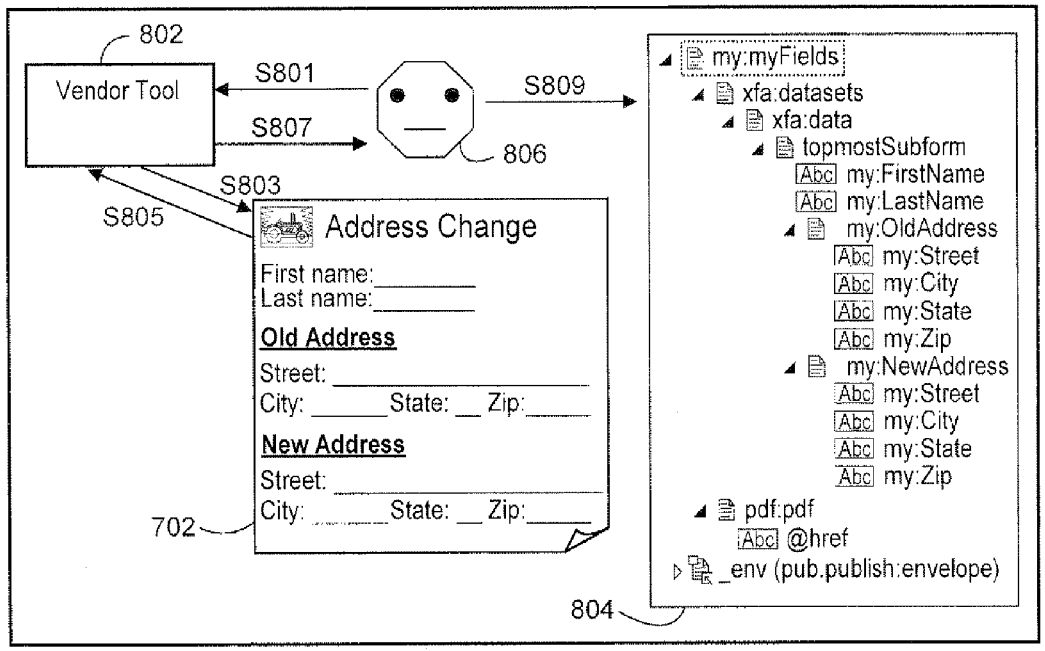
FIG. 8 illustrates an example design time process for generating a document type using a vendor-specific API.

FIG. 8 illustrates an example design time process for generating a document type using a vendor-specific API. Creation of the document type 804 using vendor APIs requires the user 806 to invoke one or more vendor APIs, e.g., via the vendor tool 802 (step S801). The vendor tool 802 interacts with the e-form 702 (steps S803 and S805). The user 806 receives e-form structure information back from the API call (S807), and the user processes the e-form structure information into a format that is meaningful for creation of the desired document type 804 (S809). As can be seen from FIG. 8, the document type 804 includes non-obvious field name values and structure.

Figure 9:
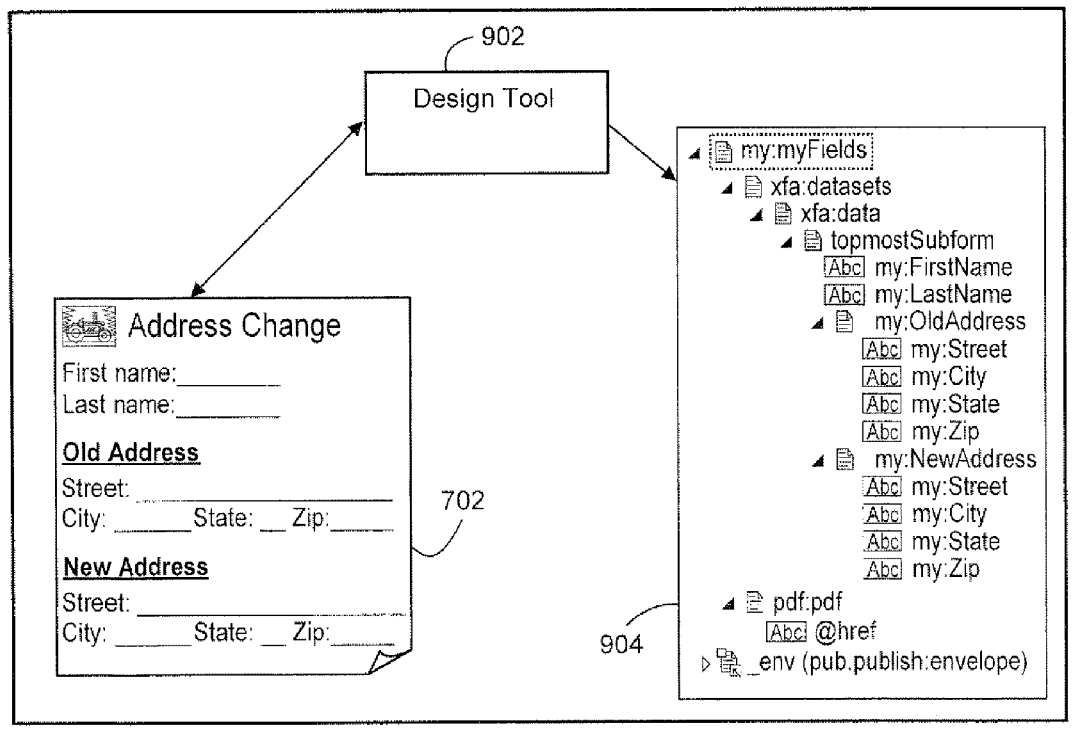
FIG. 9 illustrates an example design time process for generating a document type in accordance with certain example embodiments.

FIG. 9 illustrates an example design time process for generating a document type in accordance with certain example embodiments. In contrast with the processes shown and described in connection with FIGS. 7 and 8, the creation of the document type 804 using the techniques of certain example embodiments involves a user using a design tool 902, e.g., to browse to or otherwise specify the location of the e-form 702. Upon completion of a wizard or upon provided information via another suitable data entry mechanism (e.g., to specify where the e-form is, where the document type is to be stored, to indicate where process(es) would listen for arrivals of instances of the e-form, etc.), the structure 804 is transparently created with the necessary and sufficient structure for the document type.

The creation of the document type 904 is performed without manual data entry and/or vendor-specific APIs in certain example embodiments. This is made possible by, for example, providing the design tool 902 with access to information regarding the structure of the e-form type in general. For instance, it has been discovered by the inventors of the instant application that e-forms very frequently can be considered archived collections of files. The files can be "unzipped" or "un-archived" to obtain the collection of files therein. Once the files are obtained, they can be scanned through to identify the structure of the e-form. For instance, it has been found that many e-form creation tools store a primary XSD file that specifies the "top level" structure of the e-form. That XSD file may be extracted and may provide clues as to where the related XML documents are located and formatted. Once located and understood, the XSD and XML files may be used to help decompose previously created e-forms and to help compose or recompose e-forms in a common format.

As one, perhaps more concrete example, it has been found that Microsoft® InfoPath® uses an archived file format. That archive can be opened to reveal what may be treated as a multi-piece document structure, which includes the necessary and sufficient data needed for decomposing, composing, and/or recomposing e-forms. Two main documents therein include (1) an XSD file (e.g., a Schema.xsd or mySchema.xsd file) that provide the overall guide as to what files to be looked into for intelligence gathering operations; and (2) any associated XML files (e.g., sample.xml or sampledata.xml). Generally, GIF and/or other images, as well as XSL files, are not directly needed for a suitable document type to be generated and for the operation of example embodiments.

In the context of FIG. 9, for example, the document type 904 may or may not be the exact same document type 804 that would have been produced were vendor-specific APIs to have been used. However, even though there may be some differences, it will be appreciated that the differences may be inconsequential in terms of the overall operation of the e-form, e.g., such that the e-form and the associated processes function as expected. Thus, the FIG. 9 example document type 904 includes apparent information such as the fields appearing on the address change form 702. However, it also includes non-obvious information including, for example, namespace prefixes associated with name structures, groups of datasets with groups of data and their sub-structures, a link to the Adobe® specific document reference that captures the image of the form, etc. The example document type 904 also includes envelope information that helps trigger the associated process. As indicated above, the document type 904 may include necessary and sufficient information for enabling operation of the e-form and the associated business processes. In certain example instances, this may be the minimum set of information required to accomplish the same, although this will not be possible in all embodiments.

Figure 10:
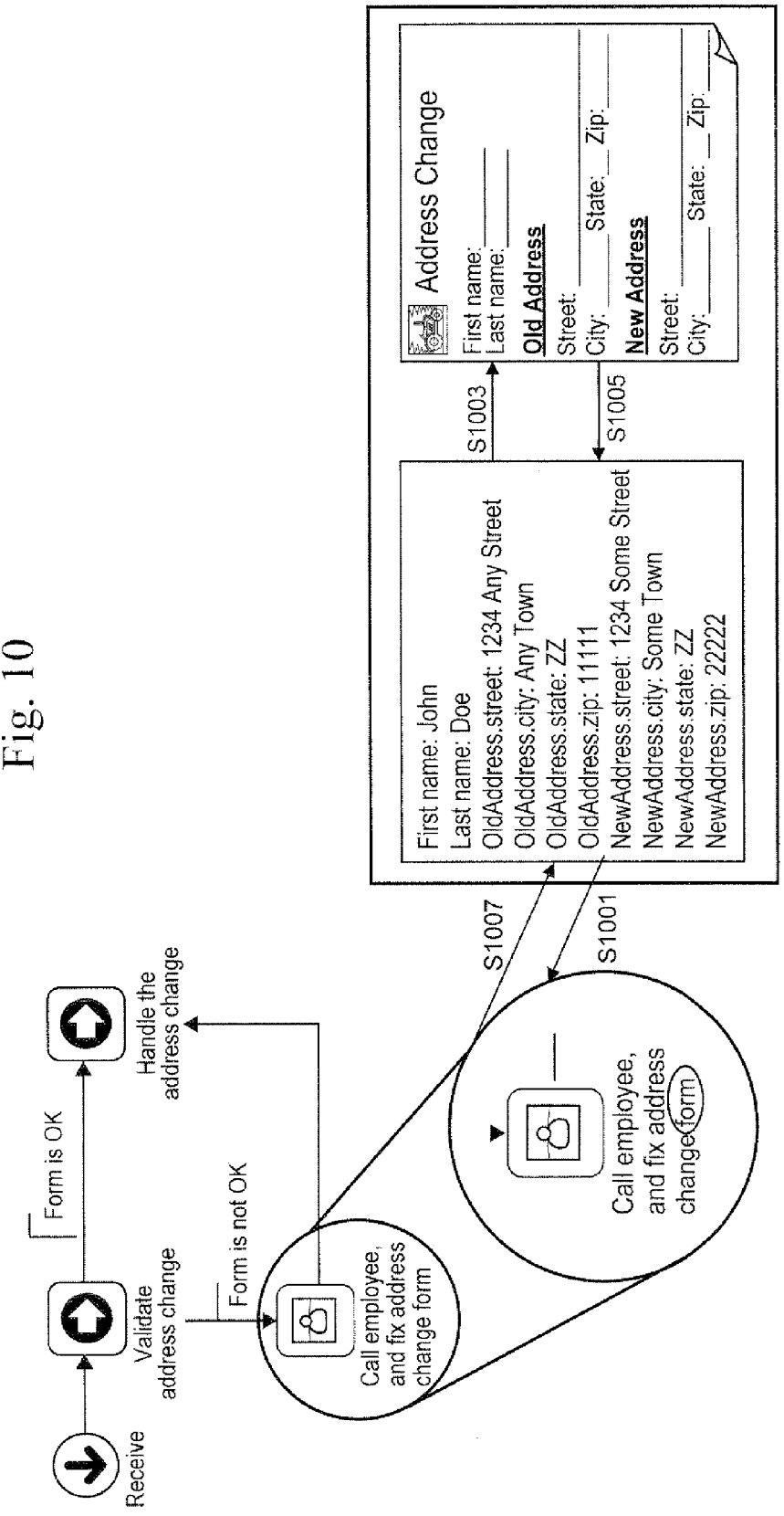
FIG. 10 illustrates an example runtime process where the composition/decomposition of e-form data is performed by hand.

FIG. 10 illustrates an example runtime process where the composition/decomposition of e-form data is performed by hand. Once triggered, the address change process validates the address change data and then either handles the address change if there are no problems, or it sends the current values of the business data to a task step where a user works with that business data to correct the problem. The task step is currently where manual work and/or deep knowledge of the e-form is required. Specifically, deep knowledge is required about both the internal structure of the e-form and the data format required by the BPM Engine, and/or the vendor-specific APIs and tools available for interacting with the e-form.

The person, userX, who handles the task step now receives the business data in the BPM Engine format (step S1001). If userX needs to work with the data in the original e-form format, then userX must manually enter the data into a blank e-form (step S1003). Once the data in the e-form is corrected, userX would perform data entry of the updated address change information into the business data form (step S1005). Finally, userX submits the business data back into the process for further handling by the process (step S1007).

Figure 11:
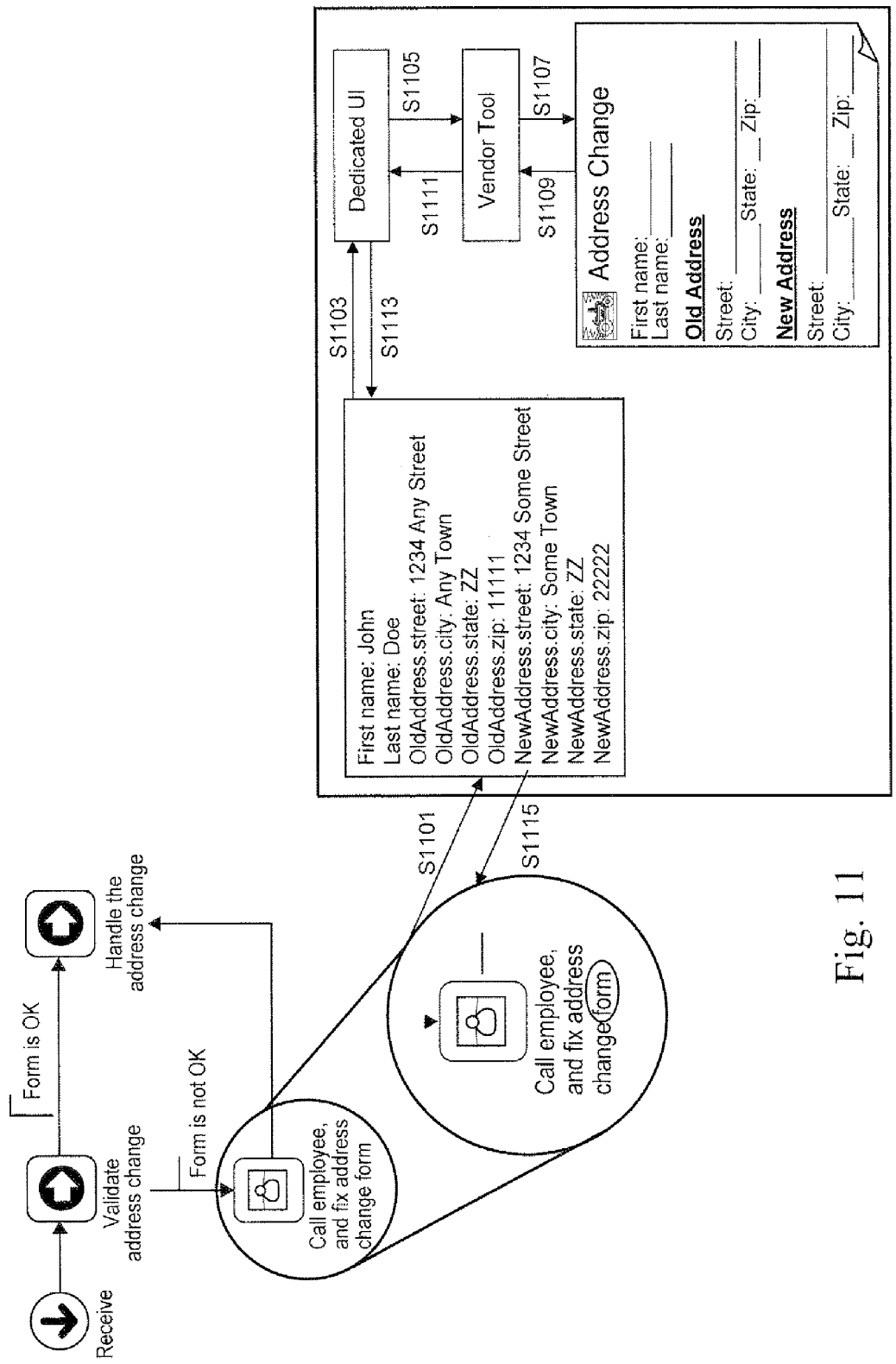
FIG. 11 illustrates an example runtime process where the composition/decomposition of e-form data is performed with vendor-specific APIs.

FIG. 11 illustrates an example runtime process where the composition/decomposition of e-form data is performed with vendor-specific APIs. In this example, userX again receives the business data in the BPM Engine format (step S1101). If userX needs to work with the data in the original e-form format, then userX uses a dedicated UI that maps the business data into the e-form (step S1103) and/or uses vendor-specific APIs to perform that translation (steps S1103, S1105, S1107, S1109, and S1111, which collectively define a "back and forth" of data between the e-form data, the dedicated UI, the vendor tool, and the e-form). Once the data in the e-form is corrected, userX would return the updated address change information via the dedicated UI into the business data form (step S1113), and userX would submit the business data back into the process for further handling by the process (step S1115). It will be appreciated that the technique of FIG. 11 involves the user having deep knowledge of the vendor-specific APIs, as well as the data format expected by the BPM Engine.

Figure 12:
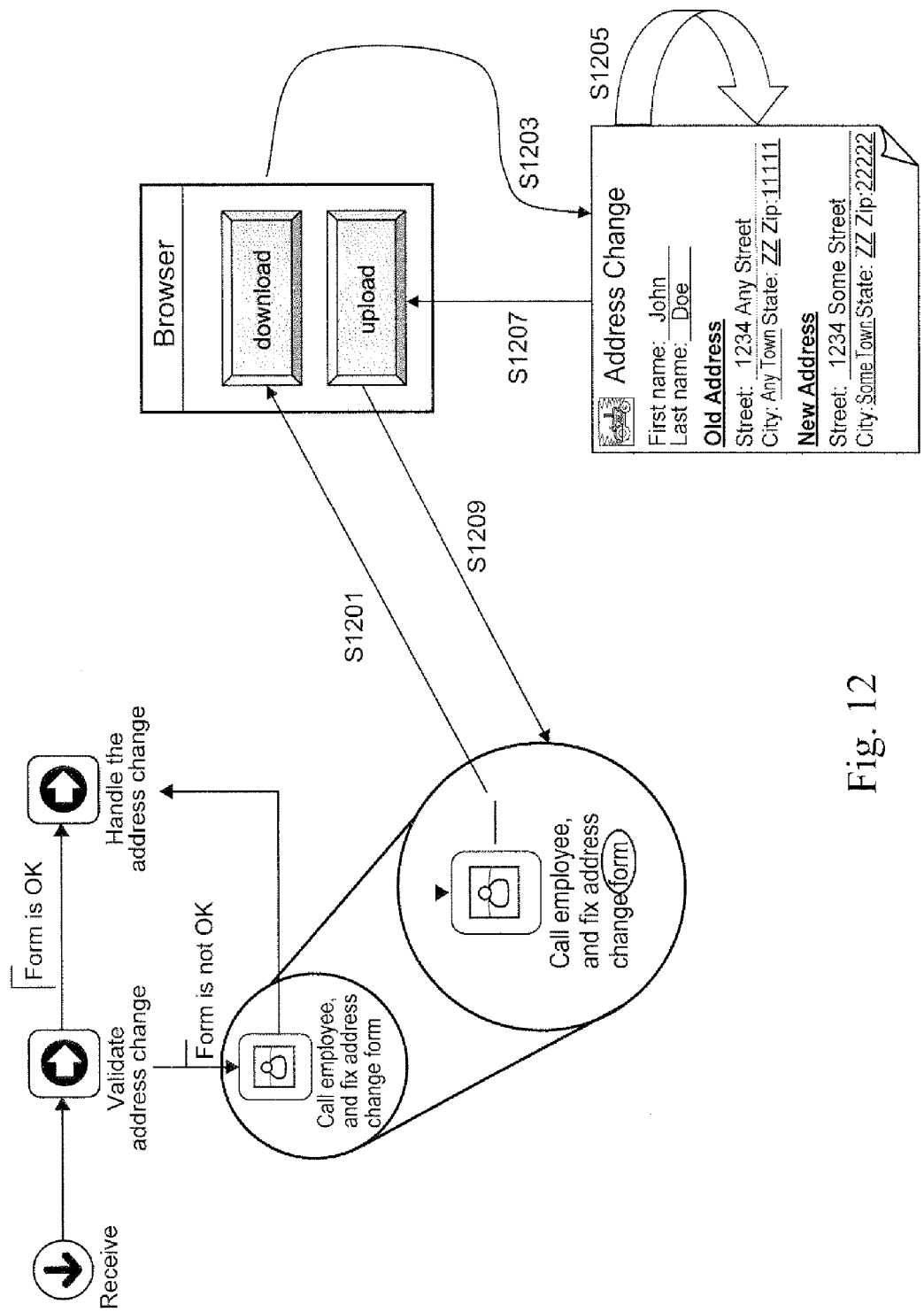
FIG. 12 illustrates an example runtime process where the composition/decomposition of e-form data is performed in accordance with certain example embodiments.

FIG. 12 illustrates an example runtime process where the composition/decomposition of e-form data is performed in accordance with certain example embodiments. In the FIG. 12 example embodiments, userX again receives the business data in the BPM Engine format (step S1201). UserX can then download the business data as an e-form transparently, e.g., to the desktop (step S1203). UserX can edit the downloaded e-form from the desktop until it is corrected (step S1205). UserX can upload the e-form (step S1207), and it is transparently decomposed back into business data for the process to continue (step S1209). It will be appreciated that the composition/decomposition process is very transparent to the user. It also will be appreciated that in this example scenario, the user need not have any knowledge of the form structure and/or content because the composition/decomposition is automatically enabled and performed by virtue of the previous intelligence concerning the e-form format, e.g., linking the e-form format to the document type expected and capable of being handled by the BPM Engine.

Figure 13:
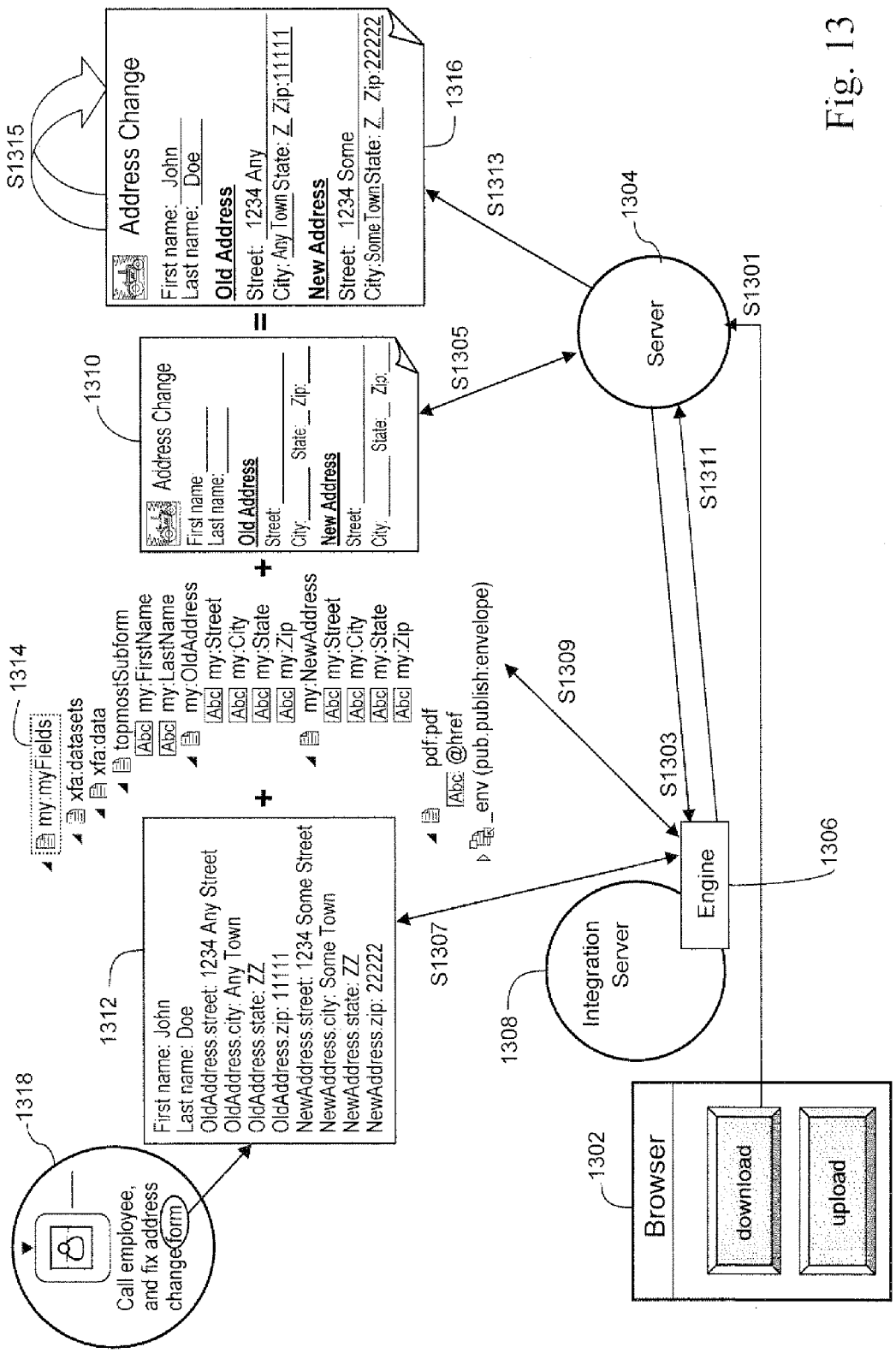
FIG. 13 is a schematic view of a system that may be used for the composition/decomposition of e-form data in accordance with certain example embodiments for an example download operation.

FIG. 13 is a schematic view of a system that may be used for the composition/decomposition of e-form data in accordance with certain example embodiments for an example download operation. When userX clicks "download" from the browser 1302, the business data as an e-form is transparently downloaded to userX's desktop, e.g., from a server 1304 with access to the e-form.

More particularly, the user clicks the download button and a message is sent to the server 1304 (step S1301). The server 1304, in turn, requests the Business Process Engine 1306 (which may be a part of an Integration Server 1308) to provide the populated e-form (step S1303) by passing to the Business Process Engine 1306 the empty e-form 1310 (step S1305). The server 1304 may be used as a repository, e.g., for different e-forms templates. For example, multiple e-form templates may be stored for multiple processes. Similarly, multiple versions of a single e-form template may be stored (e.g., to reflect different localization options or requirements, etc.). The server 1304 may also store listened-to locations. In certain example embodiments, when listened to locations are populated with an instance of an e-form (e.g., a filled in e-form), a corresponding listener may detect the same and help trigger an appropriate or corresponding business process or portion of a business process. In certain example embodiments, the location may be unique to the e-form and/or the business process or business sub-process.

The Business Process Engine 1306 is or is made aware of the business data 1312 (step S1307), as well as the document type 1314 associated with the business data (step S1309). The Business Process Engine 1306 uses the business data 1312, the document type 1314, and the empty e-form 1310 to transparently compose the e-form and ultimately provide a populated e-form to the server 1304 (step S1311). The server 1304 downloads the filled-in e-form to userX's desktop (step S1311). UserX can locally edit that e-form 1316 until it is corrected (step S1315). As will be appreciated from this description, there advantageously are no manual steps, and there advantageously is no need of e-form-vendor product specific API knowledge.

Figure 14:
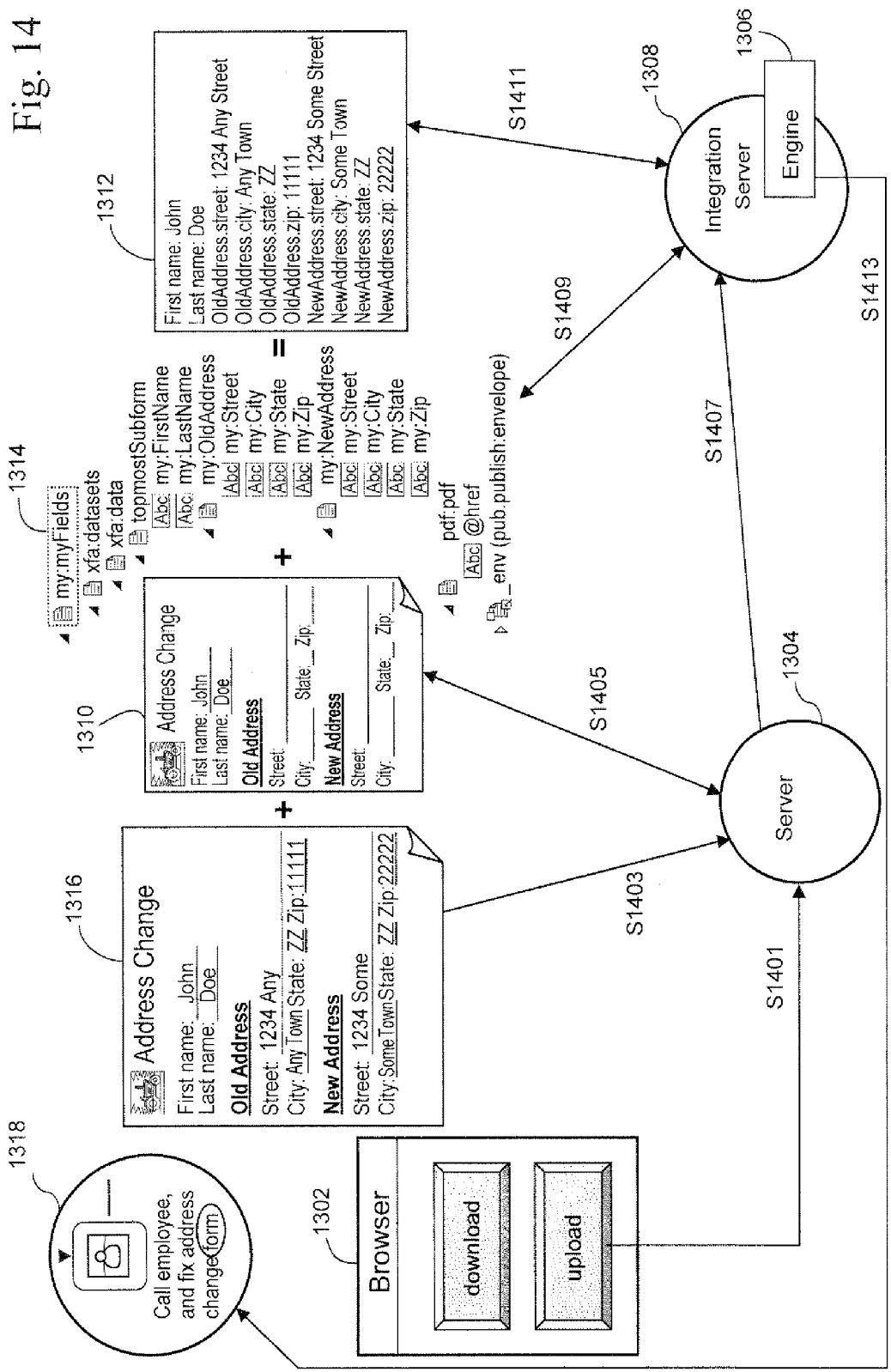
FIG. 14 is a schematic view of a system that may be used for the composition/decomposition of e-form data in accordance with certain example embodiments for an example upload operation.

When userX is done correcting the e-form, userX may click the "upload" button from the browser 1302. When "upload" is clicked, the e-form is transparently decomposed into business data for further handling by the business process. FIG. 14 details an example process for accomplishing this task. More particularly, FIG. 14 is a schematic view of a system that may be used for the composition/decomposition of e-form data in accordance with certain example embodiments for an example upload operation. When the user clicks the upload button (step S1401), the server 1304 gathers the populated e-form data 1316 (step S1403), as well as the empty e-form 1310 (step S1405), and sends this information along to the Business Process Engine 1306 of the Integration Server 1308 (step S1407). The Business Process Engine 1306 is aware or is made aware of the document type 1314 associated with the e-form (step S1409). The Business Process Engine 1306 uses the populated e-form data 1316, empty e-form 1310, and document type 1314 associated with the e-form to turn the e-form contents into the business data 1312 (step S1411), which is then available for further handling by the business process 1318 (step S1413). As above, it will be appreciated from this description, there advantageously are no manual steps, and there advantageously is no need of e-form-vendor product specific API knowledge.

Figure 15:
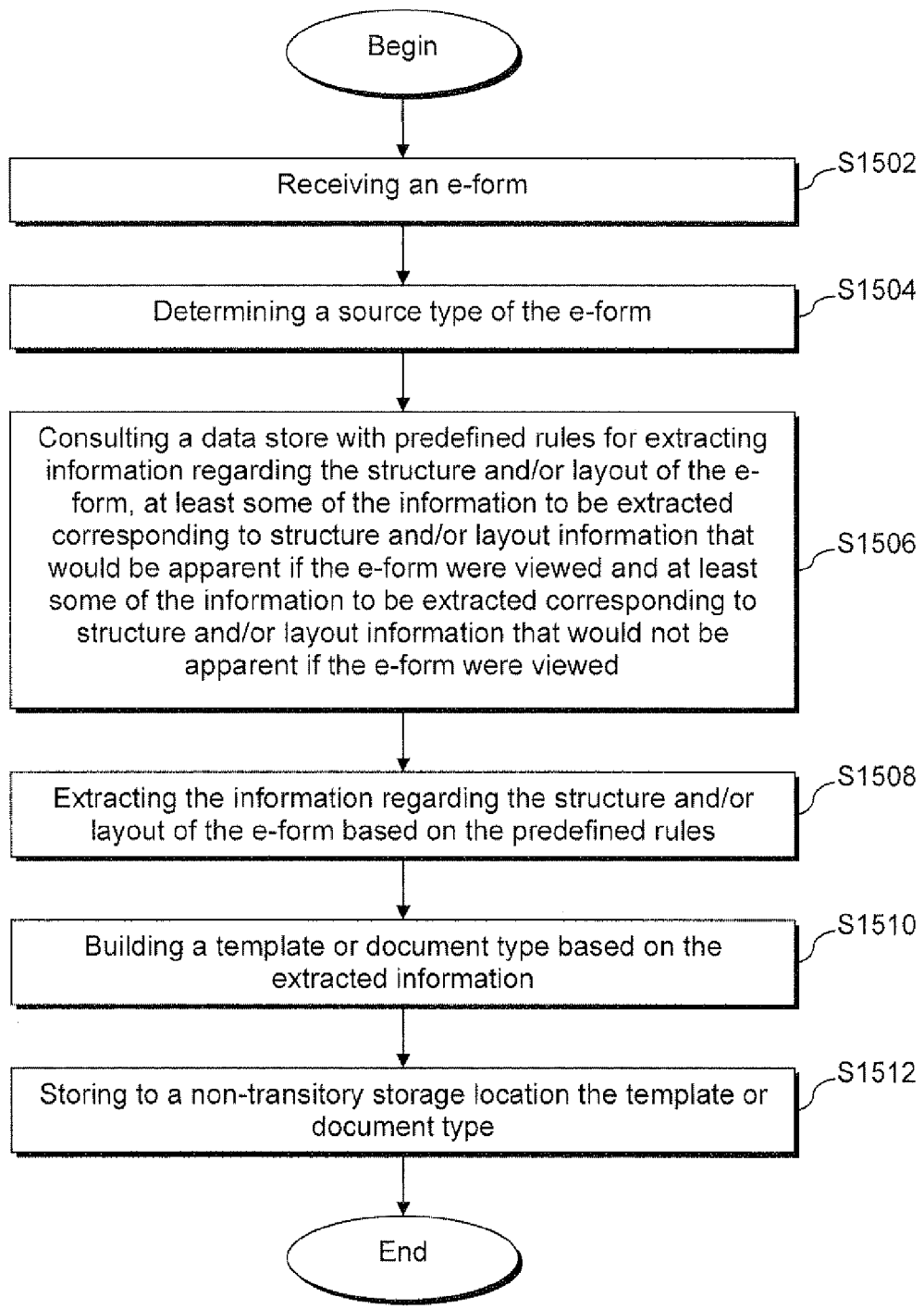
FIG. 15 is a flowchart illustrating certain composition/decomposition techniques according to certain example embodiments.

FIG. 15 is a flowchart illustrating certain design time composition/decomposition techniques according to certain example embodiments. An e-form is received in step S1502. The e-form is provided in a first format, e.g., a Microsoft® InfoPath® or Adobe® LifeCycle® format. This source type of the e-form is determined in step S1504. An algorithm (which may be located in and/or executed from a data store, for example) including predefined rules for extracting information regarding the structure and/or layout of the e-form is consulted in step S1506. At least some of the information corresponds to structure and/or layout information that would be apparent if the e-form were viewed, and at least some of the information corresponds to structure and/or layout information that would not be apparent if the e-form were viewed. In certain example embodiments, the data store may be a database that includes predefined rules for each of a plurality of different source formats. In step S1508, the information regarding the structure and/or layout of the e-form based on the predefined rules is extracted. A template or document type is built in step S1510 based on the extracted information. In step S1512, the template or document type is provided in a second format, which may in certain example embodiments be different from the first format, and may be understandable and expected by a BPM Engine. The template or document is stored in a non-transitory storage location, e.g., for later use by the BPM engine.

Figure 16:
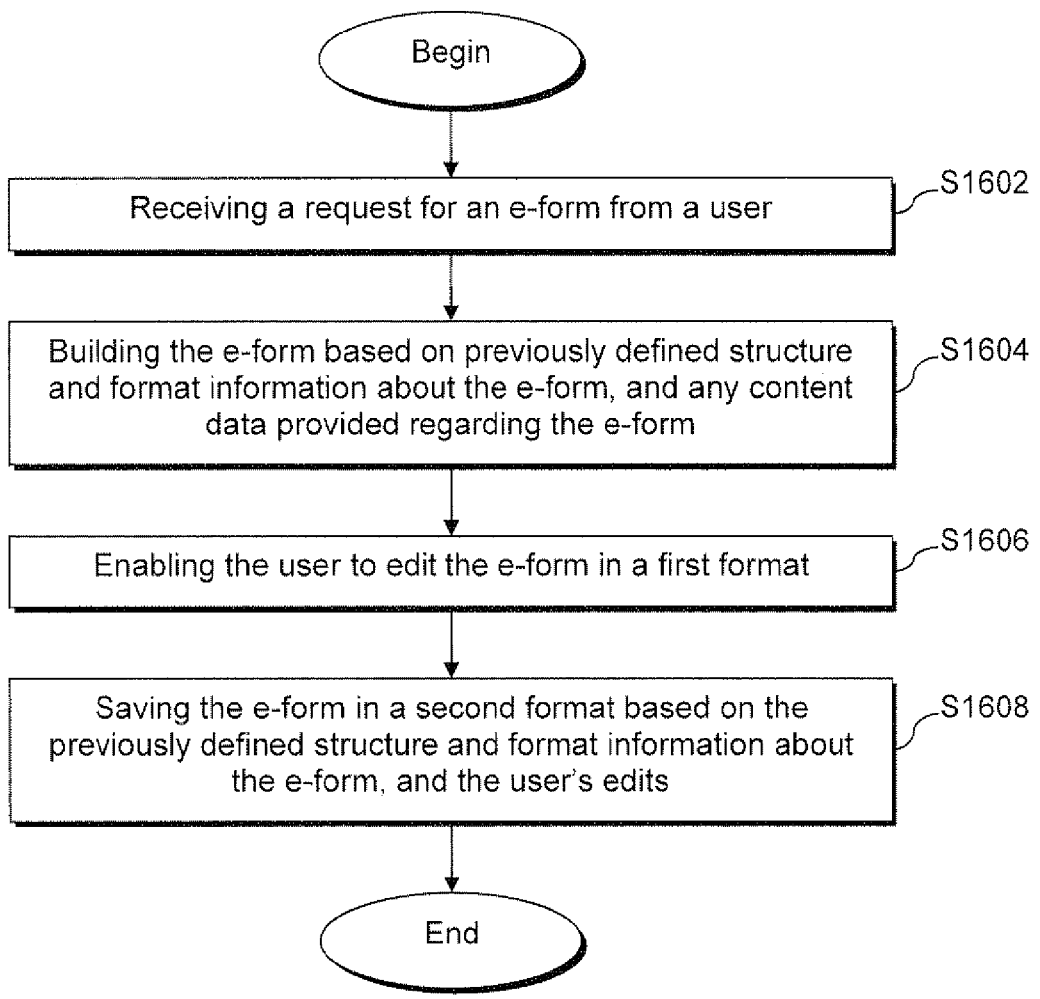
FIG. 16 is a flowchart illustrating certain design time composition/decomposition techniques according to certain example embodiments.

FIG. 16 is a flowchart illustrating certain runtime composition/decomposition techniques according to certain example embodiments. In step S1602, a request for an e-form is received from a user. In step S1604, the e-form is built based on previously defined structure and format information about the e-form, and any content data provided regarding the e-form. In certain example embodiments, the content data provided regarding the e-form is user provided content. The user is able to edit the e-form in a first format in step S1606. This editing may take place locally on the user's computer in certain example instances. The e-form may be saved in step S1608, e.g., in a second format based on the previously defined structure and format information about the e-form, and the user's edits.

The inventors of the instant application have also realized that further opportunities exist because the BPM Engine effectively serves as a universal interpreter or common intermediary format. Thus, it is possible to translate between two or more potentially propriety e-form format using the BPM Engine as an intermediary. Thus, certain example embodiments may take an e-form in a first format, decompose it into a BPM Engine understandable format, and compose it back into a second format. For instance, it may be possible to leverage the intelligence gathered to decompose an InfoPath® document into a BPM Engine understandable format, and compose it back into a LifeCycle® document, or vice versa. This may be useful in a number of different circumstances such as, for example, in providing support for legacy systems, when integrating multiple organizations with potentially disparate e-form formats (e.g., as between different human resources departments in connection with a merger or acquisition, etc.), when accepting inputs from multiple sources and passing them along to another source (e.g., from multiple suppliers to a manufacturer to wholesalers to retailers, etc.), and/or in other circumstances.

Although certain example embodiments have been described in relation to e-forms, it will be appreciated that the techniques described herein may be applied to other forms of documents. Also, although Microsoft® and Adobe® documents have been described as example e-form types, it will be appreciated that other example embodiments may be provided together with, or apart from, these example types.

It will be appreciated that as used herein, the terms system, subsystem, service programmed logic circuitry, and the like may be implemented as any suitable combination of software, hardware, firmware, and/or the like. It also will be appreciated that the storage locations herein may be any suitable combination of disk drive devices, memory locations, solid state drives, CD-ROMs, DVDs, tape backups, storage area network (SAN) systems, and/or any other appropriate tangible computer readable storage medium. It also will be appreciated that the techniques described herein may be accomplished by having a processor execute instructions that may be tangibly stored on a computer readable storage medium.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A method of transparently decomposing, composing, and/or recomposing documents, the method comprising:
   guiding a user, through a series of user-interactive elements, in creating a template or document type having a second source type different from a first source type;
   in accordance with input provided via the series of user-interactive elements, selecting an electronic form (e-form);
   determining which first source type, among a plurality of different first source types, the selected e-form was created in;
   selecting, via at least one processor and based on the determined first source type, a first algorithm among a plurality of stored algorithms that each correspond to at least one of the plurality of different first source types, each of the plurality of stored algorithms including different predefined rules for extracting, information, from an e-form of a corresponding first source type, regarding the structure and/or layout of the e-form of the corresponding first source type, at least some of the information to be extracted corresponding to structure and/or layout information that would be apparent if the e-form of the corresponding first source type were viewed and at least some of the information to be extracted corresponding to structure and/or layout information that would not be apparent if the e-form of corresponding first source type were viewed;

extracting, via the at least one processor, the information from the selected e-form regarding the structure and/or layout of the e-form based on the predefined rules of the selected first algorithm;

building, via the at least one processor, the template or document type based on both (1) the at least some of the information corresponding to structure and/or layout information that would be apparent if the e-form were viewed, and (2) the at least some of the information corresponding to structure and/or layout information that would not be apparent if the e-form were viewed;

storing to a non-transitory storage location the built template or document type; and subsequently using the built template or document type to extract content data from another e-form that was created in the determined first source type and storing the extracted content data in the second source type, wherein the second source type is a business process model (BPM) engine understandable format, and wherein the plurality of different first source types are source types not understandable by the BPM engine.

2. The method of claim 1, wherein at least some of the information to be extracted includes information pertaining to displayed fields and/or text.

3. The method of claim 1, wherein at least some of the information to be extracted includes non-displayed namespace information.

4. The method of claim 1, wherein at least some of the information to be extracted includes hierarchical information about visible fields.

5. The method of claim 1, wherein at least some of the information to be extracted corresponding to structure and/or layout information that would not be apparent if the e-form of the corresponding first source type were viewed includes at least one of: a header container, a data group, a namespace, and a data set collection.

6. A non-transitory computer readable storage medium tangibly storing instructions that, when executed by at least one processor of a system, perform a method according to claim 1.

7. A system for transparently decomposing, composing, and/or recomposing documents, comprising:

an display interface presented on a display device configured to:
  guide a user, through a series of user-interactive elements, in creating a template or document type having a second source type different from a first source type; and
  receive a selection of an electronic form (e-form);

electronic storage configured to store a plurality of algorithms that each correspond to at least one of the plurality of different first source types, each of the plurality of stored algorithms including different predefined rules indicating how information regarding the structure and/or layout of an e-form of a corresponding first source type is to be extracted, at least some of the information to be extracted corresponding to structure and/or layout information that would be apparent if the e-form of the corresponding first source type were viewed and at least some of the information to be extracted corresponding to structure and/or layout information that would not be apparent if the e-form of the corresponding first source type were viewed; and at least one processor that is coupled to the electric storage for access thereto, the at least one processor configured to:
  responsive to the selection of the e-form, select, based of a first source type of the selected e-form, a first algorithm among the plurality of stored algorithms,
  extract the information regarding the structure and/or layout of the selected e-form based on the predefined rules of the first algorithm,
  build the template or document type based on the extracted information, the built template or document type incorporating aspects of (1) the at least some of the information corresponding to structure and/or layout information that would be apparent if the e-form were viewed and (2) the at least some of the information corresponding to structure and/or layout information that would not be apparent if the e-form were viewed,
  store to a non-transitory storage location the template or document type, and
  subsequently use the built template or document type to extract content data from another e-form that was created in the determined first source type and store the extracted content data according to the second source type, wherein the second source type is a business process model (BPM) engine understandable format, and wherein the first source type is not understandable by the BPM engine.

8. The system of claim 7, wherein at least some of the information to be extracted includes information pertaining to displayed fields and/or text.

9. The system of claim 7, wherein at least some of the information to be extracted includes non-displayed namespace information.

10. The system of claim 7, wherein at least some of the information to be extracted includes hierarchical information about visible fields.

11. A method comprising:

selecting a first electronic form (e-form) that is of a second format or a second type from among a plurality of different second formats or second types;

extracting structure and format information about the selected first e-form;

automatically building, by using at least one processor, the template or document type based on both (1) structure and format information that is visible to viewers of the e-form and (2) structure and format information that is not apparent to viewers of the e-form;

storing, to electronically accessible storage that is coupled to the at least one processor, the built template or document type as defined structure and format information for the second format or the second type;

receiving a request from a user to edit an e-form in the second format or the second type that is native for the requested e-form, wherein the request is based on selection of the e-form and the corresponding second format or second type though a series of user-interactive elements, where content data to be included in the e-form, is stored on a non-transitory storage medium in a first format or of a first type that is different from the second format or the second type;

building the e-form, in the second format or the second type, based on the defined structure and format information about the second format or the second type, and the content data to be included in the built e-form, the previously defined structure and/or format information including structure and/or layout information that would not be apparent if the e-form were viewed;

outputting the built e-form to a display screen for editing by the user;

receiving content data edits from the user for the displayed e-form, the e-form being editable for content changes while in a second format or of a second type; and saving, based on defined structure and/or format information, the received content data edits that was inputted into the e-form of the second format or the second type, back to the non-transitory storage medium where the content data is stored in the first format or first type, wherein the second format or second type is not directly understandable by a business process model (BPM) engine, wherein the first format or first type is directly understandable by the BPM engine.

12. The method of claim 11, further comprising executing one or more business processes via the BPM engine as a result of the editing of the e-form.

13. The method of claim 12, further comprising:

listening to a plurality of locations on a server; and executing said one or more business processes in response to a document being placed in one of said locations on the server.

14. A non-transitory computer readable storage medium tangibly storing instructions that, when executed by at least one processor of a system, perform a method according to claim 11.

15. A system for transparently decomposing, composing, and/or recomposing documents, comprising:

an interface configured to receive a request from a user to edit an e-form in a first format or of a first type; and at least one processor configured to:

select a first electronic form (e-form) that is in a first format or of a first type from among a plurality of different first formats or first types;

in accordance with the selected first e-form, extract structure and format information about the selected first e-form;

automatically build, by using at least one processor, the template or document type based on both (1) extracted structure and format information that is visible to viewers of the e-form and (2) extracted structure and format information that is not apparent to viewers of the e-form;

store, to electronically accessible storage that is coupled to the at least one processor, the built template or document type as defined structure and format information for the first format or the first type;

retrieve, from a non-transitory storage medium system, data related to the requested e-form, the data including the stored defined structure and/or format information about the first format or the first type of the requested e-form, and content data to be included in the e-form, the data being stored on the non-transitory storage medium system in a second format or a second type, where the second format or second type is based on information provided using a series of user-interactive elements that includes selection of the first format or of a first type, build the e-form based on the defined structure and/or format information about the first format or the first type, and content data to be included in the e-form, the built e-form being in the first format or of the first type, present, via a display screen, the built e-form to a user to enable the user to edit the e-form so as to provide content data to the e-form, the e-form being editable for content changes while displayed to the user in the first format or the first type, save the previously defined structure and/or format information about the e-form, and the user's edits to content data of the e-form back to the non-transitory storage medium system to be stored in the second format or the second type, and trigger execution of one or more business processes via the BPM engine as a result of the editing and/or saving the e-form back to the non-transitory storage medium system, wherein the first format or first type is not directly understandable by a business process model (BPM) engine, and wherein the second format or second type is directly understandable by the BPM engine.

16. The system of claim 15, further comprising a plurality of listened to locations on a server, wherein said one or more business processes are executable in response to the e-form being placed in one of said listened to locations on the server.

17. The system of claim 15, wherein the structure and/or format information is previously defined using a further method that comprises:

guiding a user, through a series of user-interactive elements, in creating the template or document type, wherein the structure and format information about the selected first e-form is extracted by using an algorithm with predefined rules for extracting information regarding the structure and/or format of the e-form, at least some of the information to be extracted corresponding to structure and/or format information that would be apparent if the e-form were viewed and at least some of the information to be extracted corresponding to structure and/or format information that would not be apparent if the e-form were viewed.

18. A method of transparently decomposing, composing, and/or recomposing documents, comprising:

selecting a first electronic form (e-form) that is of a third format or a third type from among a plurality of different third formats or third types;

extracting structure and format information about the selected first e-form;

automatically building, by using at least one processor, the template or document type based on both (1) extracted structure and format information that is visible to viewers of the e-form and (2) extracted structure and format information that is not apparent to viewers of the e-form;

storing, to electronically accessible storage that is coupled to the at least one processor, the build template or document type as defined structure and format information for the third format or the third type;

decomposing and saving, to a non-transitory storage medium system, data from a second e-form that includes structure and/or format information with content data of the second e-form, the decomposed and saved data being in a second format or of a second type that is different from a first format or a first type of the second e-form;

building, using at least one processor, a third e-form based on the previously defined structure and format information that is in the third format or of the third type, and the content data from the second e-form;

displaying the built third e-form to a display screen;

receiving user edits to content data of the displayed third e-form, the third e-form being editable while in the third format or of the third type; and decomposing and saving, using the at least one processor, the third e-form back to the non-transitory storage medium system by saving data from the displayed built third e-form that includes structure and/or format information along with the received user edits to the content data of the built third e-form, the decomposed and saved data being saved in a second format or of a second type that is different from the first format or the first type, wherein the first and third formats or first and third types are not directly understandable by a business process model (BPM) engine, and wherein the second format or second type is directly understandable by the BPM engine.

19. The method of claim 18, wherein all said structure and/or format information is previously defined using a further method that comprises:

guiding a user, through a series of user-interactive elements, to create the built template or document type.

20. The method of claim 18, wherein the first format or of a first type, the second format or of a second type, and the third format or of a third type are all different formats or types.

* * * * *